Oct. 2, 1962    A. L. TRUMBULL    3,056,517
BOAT TRAILER
Filed June 8, 1959
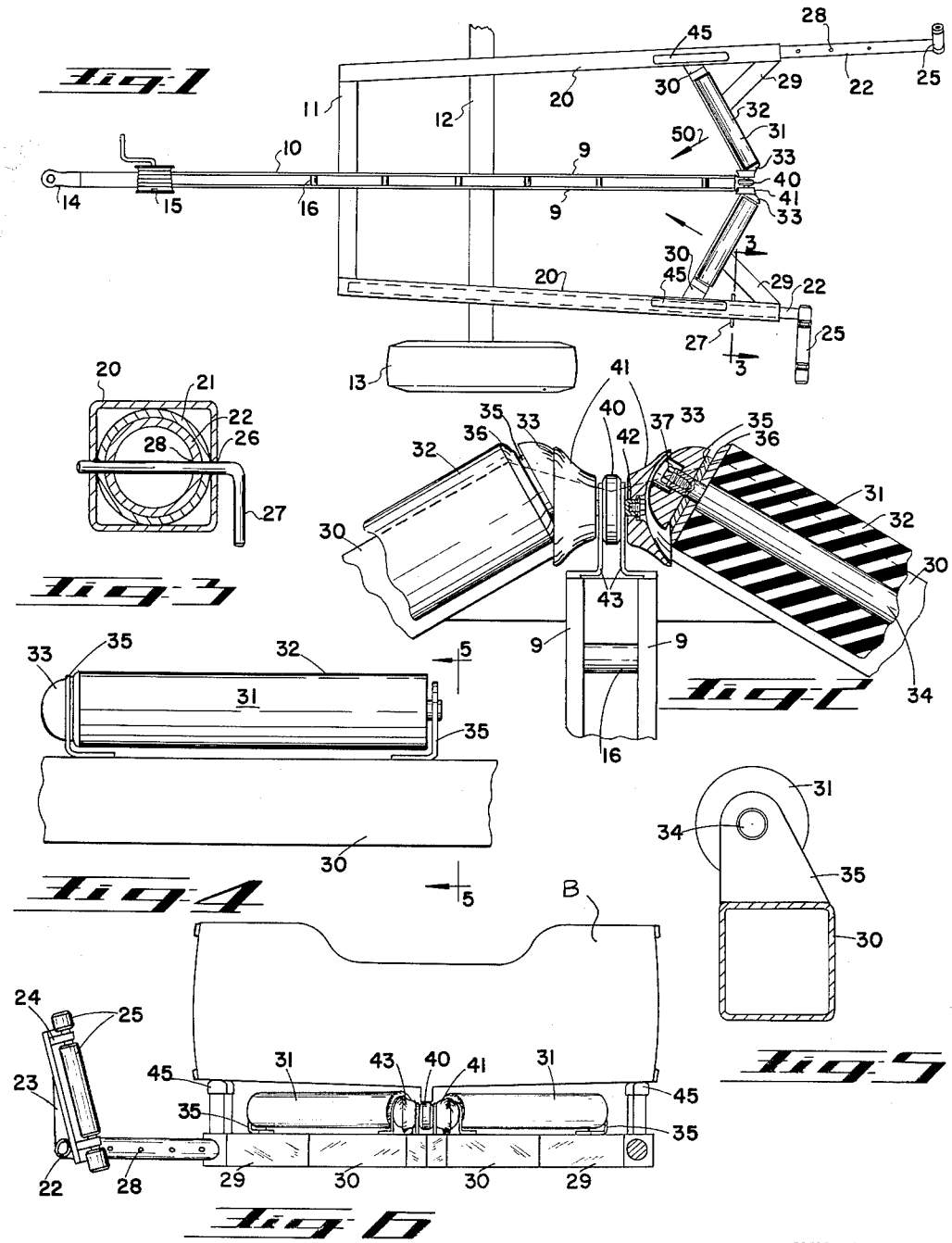
INVENTOR.
ALFRED L. TRUMBULL
BY
*G. R. Schermerhorn*
ATTORNEY United States Patent Office
3,056,517
Patented Oct. 2, 1962

3,056,517
BOAT TRAILER
Alfred L. Trumbull, 104 S.E. 87th Ave., Portland 16, Oreg.
Filed June 8, 1959, Ser. No. 818,699
7 Claims. (Cl. 214—84)

This invention relates to improvements in a boat trailer for hauling a small boat on a road or highway.

Boat trailers have been improved to the point where they provide very practical means of transportation to a launching site for small boat owners who keep their boats at a distance from the water or who wish to use their boats on different bodies of water at different times. In such service the boat is generally used for a time during the day and then hauled back home at the end of the day. The launching of the boat and the loading of the boat on the trailer become rather frequent operations which quickly destroy the pleasure of boating when the loading and unloading manipulations are difficult or laborious. This development of the boat trailer art includes very effective improved devices whereby one man can launch and load a fairly heavy boat with little or no assistance under favorable conditions.

The use of small boats, however, is not always confined to ideal weather conditions. It frequently happens that a fishing trip or pleasure cruise is suddenly terminated by an unexpected squall or storm. On such occasions, particularly, there is often considerable congestion and confusion at the launching and loading ramp by a number of boat operators seeking to use the usually limited ramp facilities at the same time. The otherwise excellent trailer loading devices give a great deal of difficulty in a wind or current, usually making it impossible for one person to load even a light boat on a conventional trailer by himself.

The loading operation involves backing the trailer into the water to a sufficient depth to either allow the boat to be floated up to the trailer or allow the bow of the boat to be floated over the rear end of the trailer. A length of line is then unreeled from a winch at the front end of the trailer and made fast to the bow of the boat so that the boat can be pulled forward on the trailer. Under favorable conditions this can be accomplished by the operator from the trailer without getting more than his feet wet. However, when the wind is blowing or the current is washing the boat to one side, it is usually necessary for one or more persons to wade out into the water waist deep and hold the boat in proper position and alignment so that it will be centered on the trailer as it is drawn aboard by the winch operator. If other persons of adequate size and strength are not present to assist or if such other persons are fully occupied tending to their own boats, very difficult and unpleasant predicaments arise which take much of the pleasure and enjoyment out of boating.

It is, therefore, the general object of the present invention to provide certain improvements in a boat trailer to facilitate the loading of the boat on the trailer at a launching ramp.

Another object is to provide means on the trailer to counteract the effects of a side wind or current in loading a boat.

Another object is to provide means for holding the bow of a boat in loading position.

Another object is to provide means for centering the keel of the boat on the trailer during the loading operation when the boat approaches the trailer in off-center position.

Another object is to provide a trailer which will load a boat without getting the wheel bearings wet.

Another object is to provide a trailer with no sharp metal projections upon which to gouge, scratch or puncture the boat in the process of loading.

The present invention involves two auxiliary devices to expedite the loading of the boat and counteract the effect of a side wind or current. One of these devices comprises a pair of guide arms which are extendable rearwardly to hold the boat in approximately centered position behind the trailer while the boat is still afloat. The other device comprises a novel arrangement of rollers to shift the boat laterally to the center of the trailer as the boat is drawn forward by the winch while it is being pulled out of the water. With the aid of these two devices a single operator can manage the loading of a boat against a fairly stiff side wind or current without submerging the trailer or the wheel bearings on the trailer.

The foregoing and other objects and advantages will become apparent and the invention will be better understood from the following description of a preferred embodiment of the invention illustrated on the accompanying drawing. Various changes may be made in the construction and arrangement of parts and certain features may be used without others, all such modifications within the scope of the appended claims being included in the invention.

In the drawing:

FIGURE 1 is a plan view of a boat trailer embodying the principles of the present invention;

FIGURE 2 is an enlarged fragmentary plan view of a portion of the rear end of the trailer shown in FIGURE 1;

FIGURE 3 is an enlarged cross sectional view taken on the line 3—3 of FIGURE 1;

FIGURE 4 is an elevation view of one of the centering rollers shown in FIGURE 2;

FIGURE 5 is a view taken on the line 5—5 of FIGURE 4; and

FIGURE 6 is a fragmentary rear elevation view of the trailer also showing the position of the boat on the trailer.

FIGURE 1 shows a plain view of the trailer comprising a tongue 10 connected with a frame 11 mounted through suitable springs, not shown, on an axle 12 having a pair of wheels, one of which is shown at 13. The front end of the tongue is equipped with a conventional trailer hitch 14 and hand winch 15. The tongue 10 is channel-shaped and preferably equipped with rollers 16 in the bottom of the channel to receive and support the keel of a boat confined between the upstanding side flanges 9 of the channel.

The frame 11 includes a pair of side members 20 of rectangular box construction having welded therein cylindrical guide tubes 21, as shown in FIGURE 3. Mounted in each tube 21 is a cylindrical tubular guide arm 22 which may be drawn out and extended to the rear. On the outer extremity of each arm 22 is a bracket 23 equipped with suitable bearings 24 for a cylindrical roller 25 which is disposed at right angles to the arm 22.

Frame member 20 and guide tube 21 are drilled at 26 to receive a locking pin 27 which may be equipped with a suitable retainer, not shown, to prevent it from falling out of the holes. Arm 22 is similarly drilled at 28 to provide a series of holes to receive lock pin 27. Arm 22 is rotatable as well as slidable in guide tube 21 whereby the holes 28 may be drilled at different angles to hold the arm 22 in different rotative positions, as desired. When the arms 22 are extended to guide a boat toward the center of the trailer for loading the boat on the trailer, it is desired to have the rollers 25 inclined outwardly at their upper ends away from a vertical position, as shown in FIGURE 6. The arm 22 on the right side of the trailer in FIGURE 1 is partially extended with its roller 25 inclined slightly from a vertical position as in FIGURE 6.

On the other hand, when the boat has been loaded and is ready for hauling on the highway, it is desired to retract the arms 22 most or all of the way into the guide tubes 21 and turn them so that the rollers 25 are disposed in approximately horizontal position as represented by the arm and roller on the left side of the trailer in FIGURE 1, or in any other position that is satisfactory for highway travel. Thus, some of the holes 28 near the outer end of each arm 22 will be disposed approximately parallel with roller 25, while other holes 28 near the inner ends of arms 22 will be oriented substantially at right angles to the direction of rollers 25, when pin 27 is mounted in horizontal position, not shown.

At the rear end of frame 11 there are a pair of cross members 30 interconnecting the rear end of tongue 10 and the opposite side members 20. Short oblique members 29 interconnect the ends of side members 20 and intermediate portions of members 30. Frame members 30 are not aligned with each other but are disposed in oblique relationship to support a pair of centering rollers 31 in V-relationship in a common horizontal plane with the outer ends of the rollers forward from the inner ends, as shown in FIGURE 1. The rollers 31 comprise cylindrical portions 32, made of any suitable material, preferably hard rubber bonded to a central metal rod or shaft 34, and hemispherical or convex end portions 33 made of metal and mounted as shown in FIGURE 2. Rod 34 is rotatably mounted in holes in a pair of upstanding bracket arms 35 bolted on the top sides of frame members 30. The rubber rollers project radially beyond these brackets and beyond the rearward vertical face of frame members 30 so that the boat cannot scrape against the brackets or against the frame members 30. End portions 33 are spaced apart according to the size and width of the center keel roller assembly. The top surfaces of cylindrical portions 32 lie in the same horizontal plane as the top edges of side flanges 9 on the tongue channel.

The bearing ends of shaft 34 are turned to smaller diameter than the central portion and are equipped with metal washers 36 to support the rubber on the ends of roller 32. Each end roller 33 is rotatable on the shaft end and centrally recessed to contain a retaining screw and washer 37 in the shaft.

The small space between the inner ends of rollers 31 is substantially filled by the center keel roller which is an assembly of three small metal rollers 40 and 41, the outer rollers 41 of which are somewhat larger in diameter at their outer edge, giving an hourglass shape to the whole assembly. The outer rollers 41 are hollowed or concave on their outer ends so as to overlap the hemispherical or convex end portions of the centering rollers 31. These roller portions 40, 41 are mounted on a metal shaft 42 which is journaled in holes in a pair of brackets 43 projecting rearwardly behind the end of tongue 10. Roller portions 40 and 41 project radially beyond this bracket so that the boat cannot scrape against the bracket. Thus, the only surfaces which the keel can contact and bear against are rotating surfaces which do not scrape or damage the boat. The center portion 40 is on approximately the same level as tongue rollers 16 and below the top sides of rollers 32 forming a trough which the keel cannot normally get out of once it gets in.

In preparation for loading a boat on the trailer under windy conditions or in a current, the arms 22 are first extended as far as desired, as exemplified by the partially extended arm on the right side of the trailer in FIGURE 1, and the trailer is backed down the loading ramp until the wheels are no more than just in the water with the wheel bearings well out of the water. Then the boat is floated in between the arms 22 until the bow makes contact with the rear end of the trailer. It is there held securely from drifting or yawing in the current or wind by the rollers 25 on the extended arms 22. The cable from the winch 15 is then made fast to the bow of the boat and the boat is drawn forward onto the trailer, finally coming to rest on the padded bunks or supports 45, as shown in FIGURE 6, which keep the boat from tipping on the trailer. Bunks 45 are mounted on side frame members 20 in elevated position slightly above the level of rollers 32. The guide tubes 21 are divergent from front to rear whereby when the arms 22 are extended, the rollers 25 are spaced wider apart than bunks 45 to receive the maximum width of the boat therebetween.

It is not necessary to try and center the bow of the boat with the center keel roller as the centering rollers do this automatically while the boat is drawn forward; nor is it necessary to worry about marring, scratching, or puncturing the boat in the process of loading after it is once confined within the extended arms 22 and rollers 25. As the keel rides up on one of the centering rollers 31 while the boat is drawn forward by the winch, the keel will not travel parallel with the tongue 10 but will follow the direction of the arrow 50 at right angles to the roll axis, shifting the keel laterally over to the central roller 40, 41 and thence into the channel of the tongue where it will be supported on rollers 16.

Oblique frame members 29 prevent the bow of the boat from crowding into the corner between cylindrical roller 32 and side frame member 20. As the boat moves forward while still afloat, the stem post is deflected by member 29 away from side frame member 20 and toward the center of roller 32.

When the boat has been drawn forward onto the bunk pads or supports and secured, the trailer may be moved up the ramp away from the water and the arms 22 retracted and rotated to turn rollers 25 to horizontal position, either inwardly or outwardly, as exemplified by the arm 22 on the left side of the trailer in FIGURE 1. FIGURE 6 shows the boat B with its bottom supported on bunks 45 slightly above rollers 31 and its keel resting on rollers 16 which do not appear in this view.

By the use of these novel features it is possible for a boat operator to load his boat on the trailer substantially without assistance under weather conditions which would otherwise make the loading operation a very difficult task.

Having now described my invention and in what manner the same may be used, what I claim as new and desire to protect by Letters Patent is:

1. In a boat trailer, a plurality of central keel rollers arranged to support the keel of a boat, a horizontal hourglass roller assembly at the rear end of the trailer, and a pair of horizontal cylindrical rollers converging rearwardly to opposite ends of said hourglass roller assembly.

2. In a boat trailer, a frame having a longitudinal central keel support, bunks on opposite sides of said frame to support the bottom of the boat, a horizontal hourglass-shaped roller assembly at the rear end of said keel support, a pair of horizontal cylindrical rollers converging rearwardly to opposite ends of said roller assembly, a pair of arms extendable rearwardly on opposite sides of said frame, and rollers on the rear ends of said arms for engaging opposite sides of a boat in floating position behind the trailer and guide the boat toward said horizontal rollers.

3. A boat trailer comprising a frame having central keel rollers to support the keel of a boat, a horizontal hourglass-shaped roller assembly at the rear end of said frame, a pair of horizontal cylindrical rollers converging rearwardly to opposite ends of said hourglass roller, a pair of longitudinal, rearwardly divergent guide tubes on opposite sides of said frame, a pair of arms extendable rearwardly from said tubes, and rollers on the rear ends of said arms for engaging opposite sides of a boat in floating position behind the trailer.

4. In a boat trailer, a trailer frame having a pair of laterally spaced longitudinal side members, a pair of guide arms extendable rearwardly individually to engage at least one side of a boat in floating position behind the trailer and prevent the boat from drifting laterally away from the trailer, arm guide means within each of said frame side members arranged to support said guide arms for individual longitudinal sliding movement along said side members, and means for supporting a boat on said frame independently of said guide arms.

5. In a boat trailer, a trailer frame, a horizontal transverse hourglass asembly on the rear end of said frame having a central horizontal roller, a pair of horizontal cylindrical rollers converging rearwardly to opposite ends of said hourglass assembly, at least one guide arm extendable rearwardly individually from one side of said frame to engage a boat in floating position behind the trailer and prevent the boat from drifting laterally in one direction away from the trailer, and means for supporting a boat on said frame independently of said guide arm.

6. In a boat trailer, a trailer frame having a pair of longitudinal side members, a plurality of central keel rollers in said frame to support the keel of a boat, a horizontal transverse hourglass assembly on the rear end of said frame having a central horizontal roller, a pair of horizontal cylindrical rollers on said frame converging rearwardly to opposite ends of said hourglass assembly, at least one guide arm extendable rearwardly individually to engage one side of a boat in floating position behind the trailer and prevent the boat from drifting laterally in one direction away from the trailer, and arm guide means within each of said frame side members arranged to support a guide arm for individual longitudinal sliding movement along said side member.

7. In a boat trailer, a center longitudinal keel support comprising a series of transverse rollers, a horizontal transverse hourglass assembly at the rear end of the trailer having a central horizontal roller in line with said series of rollers, and a pair of horizontal cylindrical rollers converging rearwardly to opposite ends of said hourglass assembly.

References Cited in the file of this patent

UNITED STATES PATENTS

| | | |
|---|---|---|
| 1,795,192 | York | Mar. 3, 1931 |
| 1,863,520 | Camerota | June 14, 1932 |
| 2,915,209 | Layne | Dec. 1, 1959 |